Jan. 3, 1967 W. H. DE WITT 3,295,239

TELEVISION PRODUCTION STAND

Filed April 22, 1965 3 Sheets-Sheet 1

INVENTOR
WILFRED H. DEWITT

BY Lockwood, Woodard, Smith & Weikart
Attorneys

Jan. 3, 1967 W. H. DE WITT 3,295,239

TELEVISION PRODUCTION STAND

Filed April 22, 1965 3 Sheets-Sheet 2

INVENTOR.
WILFRED H. DEWITT

BY Lockwood, Woodard, Smith & Weikart
Attorneys

INVENTOR.
WILFRED H. DEWITT

BY Lockwood, Woodard, Smith & Weikart
Attorneys

United States Patent Office 3,295,239

Patented Jan. 3, 1967

3,295,239

TELEVISION PRODUCTION STAND

Wilfred H. De Witt, 821 E. 36th St., Indianapolis, Ind. 46226

Filed Apr. 22, 1965, Ser. No. 450,066
11 Claims. (Cl. 40—28)

The present invention relates to a television production stand.

In present day television stations and particularly those of low budget there is no device or apparatus available for properly staging or displaying a show. Partly for this reason low budget stations must rely in large part on the large networks for their material. For example, assuming it is desired to effect a smooth pan by slowly moving an object past the camera or assuming it is desired to slowly revolve the object on its support or assuming it is desired to light an object in various ways, there is no completely satisfactory inexpensive apparatus for accomplshing these effects. Consequently, it is a primary object of the present invention to provide an improved television production stand.

A further general object of this invention is to provide a television production stand whereby many useful functions can be accomplished by a single easily moved unit.

Another object of this invention is to provide television production apparatus incorporating improved means for displaying a series of cards carrying game scores and the like or in fact any information.

A further object of this invention is to provide television production apparatus incorporating improved means for lighting a display.

Still another object of the invention is to provide television production apparatus incorporating improved means for moving an elongated sheet of material past a camera.

Still a further object of this invention is to provide television production apparatus incorporating improved means for alternately displaying information to each of a pair of cameras.

Related objects and advantages will become apparent as the description proceeds.

One embodiment of this invention might include a base, a vertical shaft mounted on said base for rotation about the axis of said shaft, crank operated means for raising and lowering said shaft relative to said base, a table support fixed to the upper end of said shaft, said table support including a horizontal open frame portion and a vertical rectangular portion secured to one edge of said frame portion to define an L-shaped cross section, a channel secured to the upper edge of said vertical rectangular portion with the concavity of said channel opening downwardly, a table including a horizontal portion and a vertical portion secured to one edge of said horizontal portion and projecting upwardly therefrom, said table being nested in said table support with said vertical portion projecting upwardly into the concavity of said channel, rollers mounted on said open frame portion for supporting said table horizontal portion for movement of said table across said table support, said table having rollers mounted on the upper edge of said vertical portion of said table and positioned to engage said channel in the concavity thereof to maintain said table horizontal when a portion of said table overhangs said table support, and crank means for moving said table relative to said table support.

The full nature of the invention will be understood from the accompanying drawings and the following description and claims.

Figure 1:
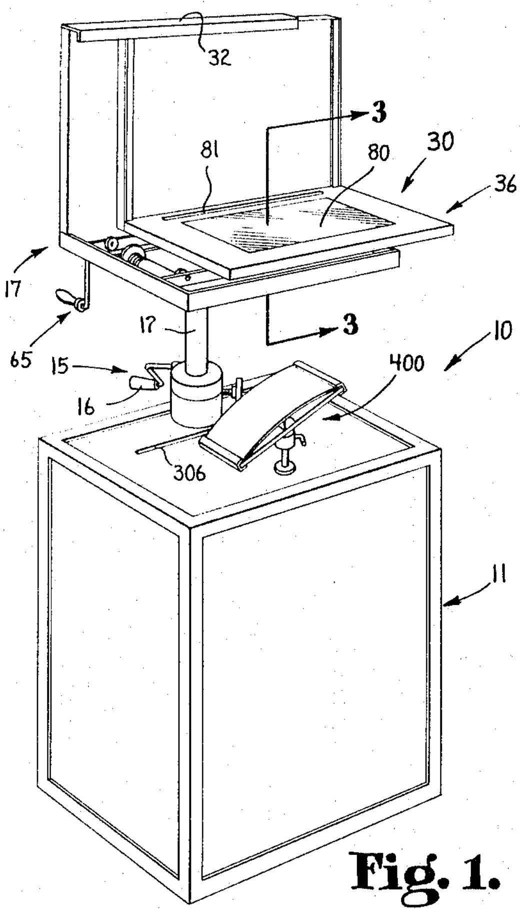
FIG. 1 is a perspective view of the television production stand of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a television production stand 10 which may be supported upon rollers (not shown) capable of being locked in any given position. Such rollers permit movement of the stand 10 from place to place and also insure that it will remain firmly in any given position to which it is moved. The stand further includes a lower portion or base 11 which may be provided with internal shelves (not shown) for storing various attachments forming a part of the present device and other tools usable in television program production.

Figure 3:
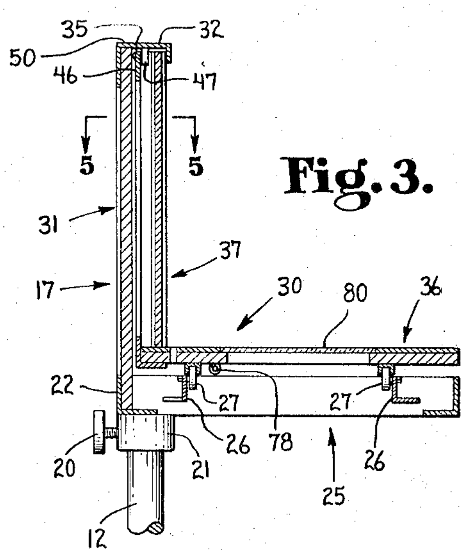
FIG. 3 is a vertical section taken along the line 3—3 of FIG. 1 in the direction of the arrows.

Mounted upon the base 11 for rotation about its vertical axis is a shaft 12. The shaft 12 is connected to the base by means of an elevating post arrangement 15 which is commercially available and might comprise a Sampson Elevator Column No. 7900, manufactured by the Quickset Corporation of Skokie, Illinois 60078. The elevating post arrangement 15 includes a crank 16 which can be turned to slowly raise or lower the post 12. As mentioned, the post 12 is also rotatable about its axis relative to the base 11. This rotation can be accomplished by manually turning the table support 17 fixed to the upper end of the post 12. The table support 17 is secured to the upper end of the post by means of an externally knurled set screw 20 (FIG. 3) which is threaded into a collar 21 fixed to an angle 22 forming a part of the table support 17.

The table support 17 further includes a horizontal frame portion 25 which is centrally open and has extending longitudinally thereof angles 26 fixed at their opposite ends to the frame portion 25. The angles 26 have mounted there along at equally spaced intervals a plurality of rollers 27 which function to support a table 30 and permit the table to be moved across the table support 17. The table support further includes an upright or vertical rectangular portion 31 at the upper edge of which is provided a channel 32 having its concavity 35 opening downwardly.

Figure 5:
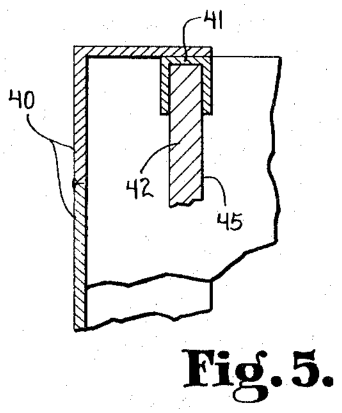
FIG. 5 is an enlarged section taken along the line 5—5 of FIG. 3 in the direction of the arrows.

The table 30 includes a horizontal portion 36 and a vertical portion 37 secured to one edge of the horizontal portion 36. The vertical portion 37 is shown in detail in FIG. 5 as including a steel upright portion 40 having a pair of channels 41 (one not shown) mounted on the steel upright portion 40 and opening toward one another for reception of a board 42. The board 42 may have on its forward face 45 background indicia or art work for use in a given display. Thus, a number of the boards 42 can be provided for creating different background effects. Alternatively the board 42 can be removed from the channels 41 by moving the table 30 away from the table support and lifting the board 42 directly upwardly so that it slides out of the channels 41. When the board 42 is removed, the steel portion 40 of the upright portion 37 of the table can be used to display magnetically supported information, art work and the like.

At the upper edge 46 of the portion 37 (FIG. 3) there is rotatably mounted a plurality of rollers 47 which can engage the concavity 35 or web 50 of the channel 32 to support the table when a portion of it is overhanging the table support. Referring for the moment to FIG. 1, assume that the table 30 is moved rightwardly a somewhat greater distance than illustrated so that there is a cantilever action tending to pull the table down and away from the table support. The rollers 47 prevent the cantilever action from causing the table to tilt and fall away from the table support.

Figure 4:
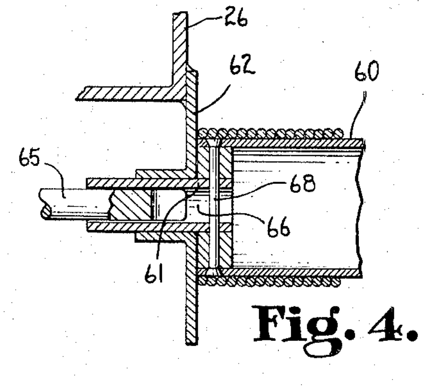
FIG. 4 is an enlarged section taken along the line 4—4 of FIG. 2 in the direction of the arrows.
Figure 2:
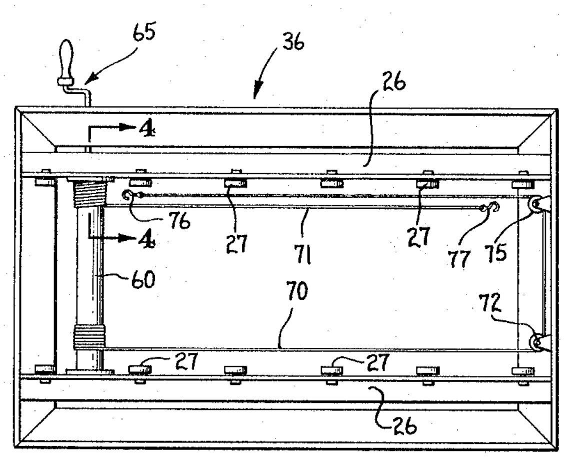
FIG. 2 is an enlarged top plan of a table support forming a part of the structure of FIG. 1.

Referring more particularly to FIG. 2, there is mounted on the horizontal frame 36 and more particularly upon the longitudinally extending angles 26 thereof a roller or drum 60 which is also shown in FIG. 4. The roller 60 has oppositely projecting trunnion elements 61 which extend through bearing members 62 fixed to the angles 26. A removable crank 65 can be projected into the hollow interior 66 of either one of the trunnion elements 61 and can be engaged with a radially extending assembly pin 68 to rotate the roller 60 for moving the table 30 across the table support and out beyond the edges of the table support. This action is effected by the lines or cords 70 and 71 which are both wound on the roller 60 but which are wound in opposite directions on the roller 60. Thus, if one of the cords is wound upon the roller by rotating the crank the other cord is unwound and vice versa. The cord 70 is trained onto two pulleys 72 and 75 rotatably mounted on the frame 36. The free end 76 of the cord 70 is secured to the table by a suitable eyelet while the free end 77 of the cord 71 is also secured to the table 30 by an eyelet and more particularly by the eyelet 78. The eyelets are positioned in the manner suggested by FIG. 2. That is, assuming that the table 30 is at the center of its travel, the eyelets are so secured to the table horizontal portion 36 as to be engaged with the free ends 76 and 77 of the cords 70 and 71.

The horizontal portion 36 of the table 30 has a rectangular glass portion or transparent portion 80 centrally mounted therein so that light can be passed upwardly through the horizontal frame of the table support and through the transparent portion 80 to light an object supported for display upon the transparent portion 80. The horizontal table portion 36 also includes a slot 81 which extends substantially the entire length of the portion 36 and the purpose of which will be described below.

Figure 6:
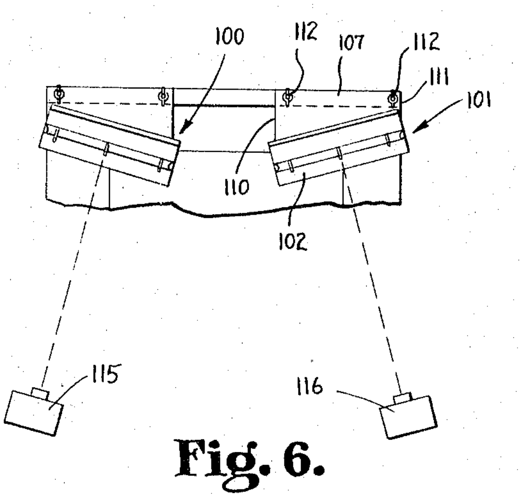
FIG. 6 is a fragmentary top plan of the stand of FIG. 1 additionally showing certain attachments forming a part of the present apparatus.
Figure 7:
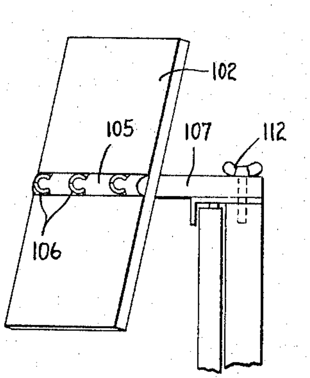
FIG. 7 is a side elevation of the structure illustrated in FIG. 6.

Referring to FIGS. 6 and 7, there is illustrated a pair of card supports 100 and 101. The card support 101 will be described below as representative of the card supports and includes a rectangular board 102 supported in a generally vertical but somewhat slanted or tilted position. Secured to the board 102 is a conventional loose-leaf binder incorporating split rings 106 which can be pulled apart or pushed together for supporting cards not shown) which can be swung or flipped from an upward to a downward position. The board 102 has fixed to its rearward surface a horizontal member 107 which, as is suggested in FIG. 6, has a quadrialteral shape but with two parallel sides 110 and 111. The board 107 is fixed to the upright portion 31 of the table support 25 by means of thumb screws 112. As can be seen in FIG. 6, there are two of the card supports 100 and 101 provided and the boards 102 thereof face outwardly somewhat away from each other so that a pair of cameras 115 and 116 can be used in connection with the card supports. Thus, the flipping action can be accomplished if desired when the particular camera focused on the card support is not in operation and instead the other camera of the two 115 and 116 is in operation.

Figure 8:
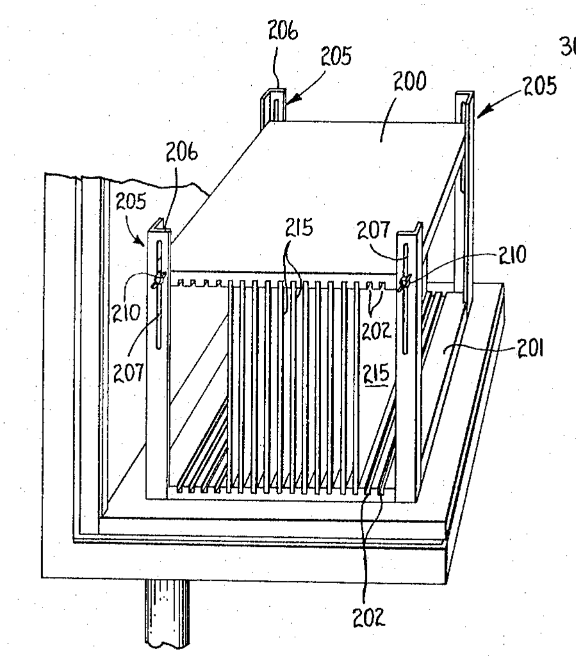
FIG. 8 is a fragmentary perspective view of the stand of FIG. 1 with a further attachment mounted thereon.

Referring now more particularly to FIG. 8, a further attachment for the present device includes a pair of parallel members 200 and 201 each of which have a plurality of equally spaced grooves 202. The members 200 and 201 are fixed in parallel spaced relation, with the members 202 opening toward corresponding grooves in the other two members, by means of angles 205. The lowermost end of the angles 205 may be fixed by a screw or a pair of screws to the lowermost member 201. The upper ends 206 of the angles 205 are slotted, however, at 207 so as to receive thumb screws 210 which provide vertical adjustability of the upper member 200. The purpose of the device shown in FIG. 8 is to permit cards 215 to be supported in such a position that they can be displayed in front of the camera and to permit the cards to be quickly withdrawn to the side by sliding in the grooves 202.

Figure 9:
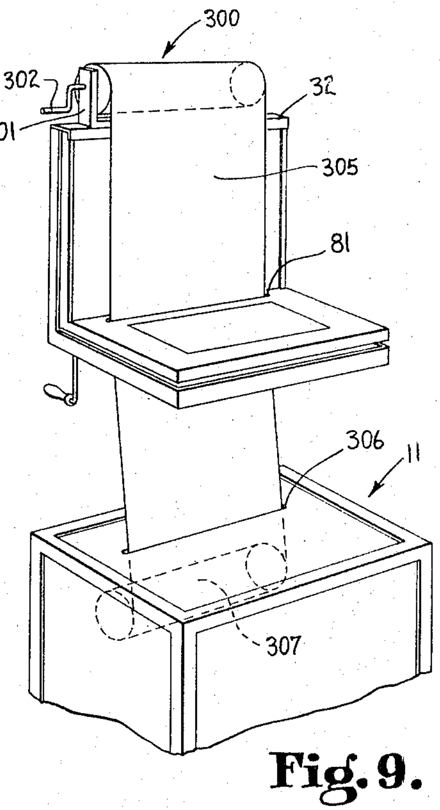
FIG. 9 is a perspective view similar to FIG. 1 with still another attachment forming a part of the present invention in assembled relation with the stand.

In FIG. 9 a further attachment of the present invention is illustrated as including a roller 300 mounted on a bracket 301 and attached to be turned or cranked by the crank 302. The bracket 301 is mounted upon the upper channel 32 of the table support. An elongated sheet 305 of paper or the like is displayed before the camera by rotating the crank 302 causing the paper to move upwardly and to wind itself on the roller 300. The base 11 has a slot 306 through which the sheet 305 moves from a supply roller 307 suitably mounted in the base. The sheet also passes through the slot 81 in the table horizontal portion. Alternatively the sheet may extend to the rear of the base 11 and the table 30 and not pass through the slots 81 and 306 as it moves between the rollers 300 and 307. Of course, the lower spool or roller 307 should have its axis turned 180 degrees end-to-end to accomplish this function. The purpose of such operation is to leave the table 30 free and ready for other uses.

Figure 10:
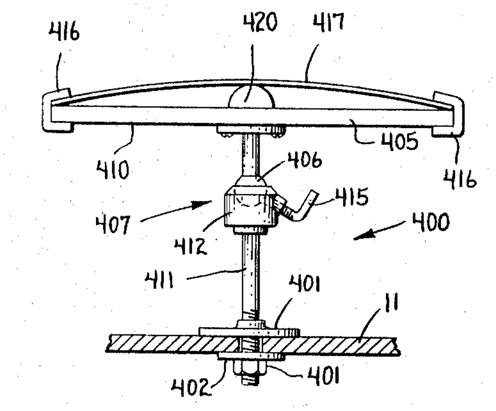
FIG. 10 is a side elevation partially in section and showing light reflecting apparatus forming a part of the structure of FIG. 1.

In FIG. 10 there is shown a light reflecting apparatus 400 which is mounted on the base 11 by suitably internally threaded members 401 and by the washer 402. The reflecting device 400 includes a support element 405 having the ball 406 of a ball-and-socket arrangement 407 secured to the rearward face 410 thereof. The rod 411 has mounted on its distal end the socket portion 412 of the ball-and-socket arrangement. The socket portion 412 threadedly receives a tightening screw 415 for locking the support element 405 to any position or attitude to which it is adjusted. Mounted on the support element 405 are clamps 416 which clamp to the support element the opposite edges of an aluminum reflecting member 417 and produce the curvature in the member 417. The reflecting device 400 is shown in FIG. 1 and is used to reflect light upwardly through the transparent portion 80 for lighting an object displayed before the camera. Thus, to mention one possible use, a glass being filled with beer for a beer commercial can be lighted in various ways by the device 400 and by a remotely placed light source which supplies the light to the reflecting device 400.

Figure 11:
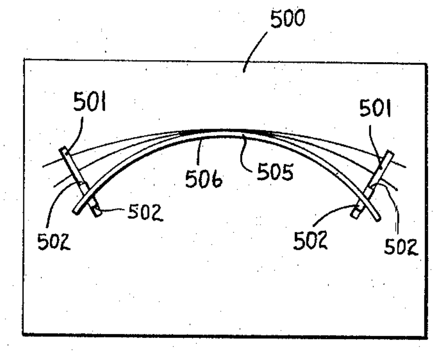
FIG. 11 is a top plan of a further attachment usable with the present invention.

In FIG. 11 there is illustrated a board 500 which can rest upon the table 30 and which has secured thereto a pair of projections 501 having a plurality of slots 502 opening externally of the distal end of the projections 501. The member 505 is a resilient element having on its surface 506 information, art work or the like to be displayed to a camera. The curvature which can be effected in the member 505 by the structure illustrated in FIG. 11 is desirable in the situation that a camera is positioned relatively closely to the structure of FIG. 11. In this event the entire surface 506 of the resilient member 505 can be equally spaced from the focal point of the camera to improve definition.

Most of the function and operation of the present invention should be clear from the above description. Of course, the table 30 can be moved a very substantial distance from side to side slowly or rapidly or can be moved upwardly or downwardly by the two crank means provided and in order to produce a smooth "pan." Smooth "dollies" in and out can also be accomplished by positioning the camera in the direction of movement of the table 30 when the table is moved by the cranking of crank 65. Also a pair of cameras can be positioned one on each side of the table 30 so that as the table is moved by the crank 65 the table moves toward one of the cameras and away from the other camera. The card holder of FIG. 8 may be used in connection with this motion as cards may face simultaneously in opposite directions. The card holder of FIG. 8 also can be positioned on its end instead of its bottom so that cards can be withdrawn in an upward direction producing a "wipe up."

Figure 12:
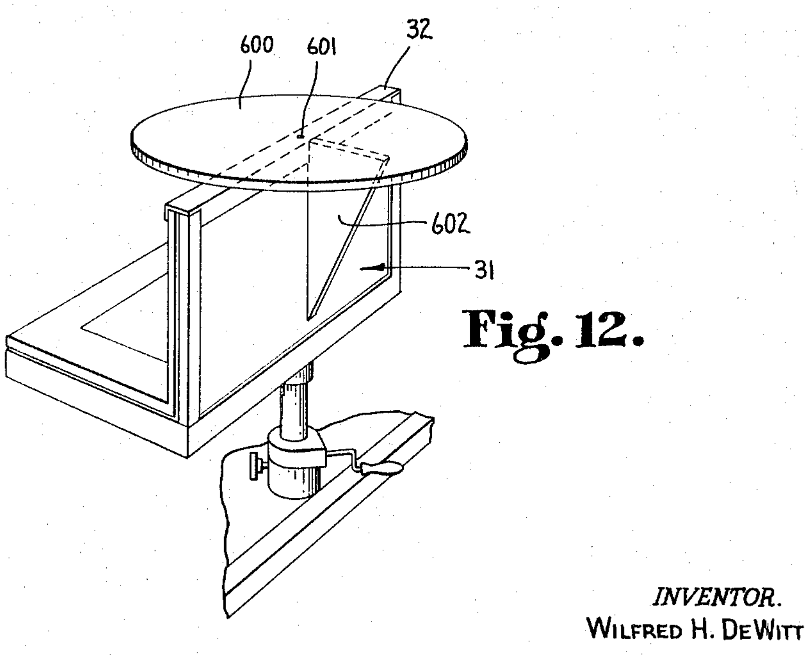
FIG. 12 is a fragmentary perspective view of the television production stand showing still another attachment embodying the present invention mounted on the stand.

Referring now more particularly to FIG. 12, there is illustrated a circular table 600 which may be mounted on the channel 32 by means of a recessed bolt 601 which extends into a suitably internally threaded bore in the channel 32. A brace 602 is fixed to the lower surface of the table 600 and to the rearward surface of the upright rectangular portion 31 of the table support 17 in order to firmly mount the table 600. The purpose of the table 600 is to support an object being displayed before the television camera and to permit the object to be slowly rotated by rotating the table 30 about the axis of the shaft 12.

It will be evident from the above description that the present invention provides an improved television production stand. It will be evident that the television production stand of the present invention incorporates improved means for lighting a display, incorporates improved means for moving an elongated sheet of material past a camera and also incorporates improved means for alternately displaying two sets of information to a pair of cameras.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A televison production stand comprising a base, a shaft mounted on said base for rotation about the axis of said shaft, crank operated means for raising and lowering said shaft relative to said base, a table support fixed to the upper end of said shaft, said table support including a horizontal portion and a vertical portion secured to one edge of said horizontal portion to define an L-shaped cross section, a channel secured to the upper edge of said vertical portion with the concavity of said channel opening downwardly, a table including a horizontal portion and a vertical portion secured to one edge of said horizontal portion and projecting upwardly therefrom, said table being nested in said table support with said vertical portion projecting upwardly into the concavity of said channel, means for moving said table across said table support.

2. A televison production stand comprising a base, a vertical shaft mounted on said base for rotation about the axis of said shaft, crank operated means for raising and lowering said shaft relative to said base, a table support fixed to the upper end of said shaft, said table support including a horizontal open frame portion and a vertical rectangular portion secured to one edge of said frame portion to define an L-shaped cross section, a channel secured to the upper edge of said vertical rectangular portion with the concavity of said channel opening downwardly, a table including a horizontal portion and a vertical portion secured to one edge of said horizontal portion and projecting upwardly therefrom, said table being nested in said table support with said vertical portion projecting upwardly into the concavity of said channel, rollers mounted on said open frame portion for supporting said table horizontal portion and crank means for moving said table across said table support.

3. A television production stand comprising a base, a vertical shaft mounted on said base for rotation about the axis of said shaft, crank operated means for raising and lowering said shaft relative to said base, a table support fixed to the upper end of said shaft, said table support including a horizontal open frame portion and a vertical rectangular portion secured to one edge of said frame portion to define an L-shaped cross section, a channel secured to the upper edge of said vertical rectangular portion with the concavity of said channel opening downwardly, a table including a horizontal portion and a vertical portion secured to one edge of said horizontal portion and projecting upwardly therefrom, said table being nested in said table support with said vertical portion projecting upwardly into the concavity of said channel, rollers mounted on said open frame portion for supporting said table horizontal portion for movement of said table across said table support, said table having rollers mounted on the upper edge of said vertical portion of said table and positioned to engage said channel in the concavity thereof to maintain said table horizontal when a portion of said table overhangs said table support, and crank means for moving said table across said table support.

4. The televison production stand of claim 3 wherein said crank means comprises a spool rotatably mounted on said open frame portion at one end thereof, a crank removably engaged with one end of said spool and engageable with the other end of said spool for rotation thereof, a pair of cords secured by one end to said spool and wrapped around said spool in opposite directions, pulley means rotatably mounted on said open frame portion at the other end thereof and having one of said cords trained therearound, said cords extending past one another and secured at their other ends to opposite ends of said table horizontal portion for moving said table across and outboard of said table support.

5. The television production stand of claim 3 wherein said table horizontal portion is transparent, light reflecting means mounted on said base for reflecting light from a remote source up through said transparent horizontal portion.

6. The television production stand of claim 3 wherein said table vertical portion includes a steel rectangular back layer portion usable for supporting sheets of material held by magnets, said steel portion having vertically extending sideward edges, a pair of channels secured to said steel portion sideward edges and opening inwardly toward one another for slidably receiving a rectangular board.

7. The television production stand of claim 3 additionally comprising a pair of rectangular boards mounted on the top of said channel and canted so that one face of each board extends in a somewhat upwardly facing relation and faces away from said face of the other board, a pair of split ring type loose leaf binders each mounted on a respective one of said boards at said faces thereof and adapted to support a pair of sets of cards for alternate flipping and displaying thereof to a pair of cameras.

8. The televison production stand of claim 3 additionally comprising a card box supported on said table horizontal portion, said box including a pair of parallel rectangular members, a plurality of slotted angles adjustably fixing said parallel members in spaced parallel relation, said parallel members having mutually facing surfaces and mutually facing and aligned slots in said surfaces, and cards received in said slots.

9. The television production stand of claim 3 additionally comprising an elongate flexible display sheet, a pair of spools one mounted on said channel and the other in said base, said sheet having its opposite ends wound on the respective spools, said base and said table horizontal portion having slots through which said sheet selectively extends, crank means on said channel spool rotatable to move said sheet across the vertical portion of said table, said sheet also being selectively extendible between said rollers without extending through said slots.

10. The television production stand of claim 3 additionally comprising a flat member resting on said table horizontal portion, a pair of projections extending from said flat member, a plurality of slots in each of said projections, said slots being arcs of circles of varying diameters and each of said circles having an arc in each projection, and a resilient display sheet selectively engageable in the slots of each circle to cause said display sheet to assume the shape of each circle.

11. The television production stand of claim 5 wherein said light reflecting means comprises a ball and socket mounted on said base, a flat backing member mounted on said ball and socket, a reflecting member, clamps on the opposite edges of said reflecting member securing said reflecting member to said backing member, and spacer means of desired thickness received between said reflecting member and said backing member for placing desired curvature in said reflecting member.

References Cited by the Examiner

UNITED STATES PATENTS

| | | | |
|---|---|---|---|
| 1,830,596 | 11/1931 | Dina | 352—243 X |
| 2,505,990 | 5/1950 | Pollock | 40—28 X |
| 2,803,900 | 8/1957 | Jones | 40—86 X |
| 2,857,226 | 10/1958 | Schenk | 108—147 |
| 2,994,740 | 8/1961 | Conkwright. | |
| 3,055,131 | 9/1962 | Novak | 40—36 |

EUGENE R. CAPOZIO, *Primary Examiner.*

W. J. CONTRERAS, *Assistant Examiner.*